ly cold environments has a pump for passing hydraulic fluid from a reservoir to a hydraulic cylinder of a work element via a control valve that is positioned a relatively great distance from the hydraulic cylinder. Fluid pathways are provided for substantially continuously moving hydraulic fluid between the control valve and hydraulic cylinder during operation of the pump.

United States Patent [19]
Bridwell et al.

[11] 4,059,042
[45] Nov. 22, 1977

[54] HYDRAULIC SYSTEM FOR EXTREMELY COLD ENVIRONMENTS

[75] Inventors: John W. Bridwell, Peoria; George H. Meiner, III, Morton, both of Ill.

[73] Assignee: Caterpillar Tractor Co., Peoria, Ill.

[21] Appl. No.: 729,542

[22] Filed: Oct. 4, 1976

[51] Int. Cl.² .................. F15B 13/04; F15B 11/08
[52] U.S. Cl. .......................... 91/469; 91/31; 91/32; 91/431; 91/450
[58] Field of Search ........... 91/31, 391 R, 431, 375 A, 91/32, 450, 469

[56] References Cited
U.S. PATENT DOCUMENTS

| | | | |
|---|---|---|---|
| 2,688,313 | 9/1954 | Bauer | 91/431 |
| 3,465,842 | 9/1969 | Hruska | 91/375 A |
| 3,815,697 | 6/1974 | Bridwell et al. | 180/6.2 |
| 3,831,491 | 8/1974 | Thomas | 91/391 R |

Primary Examiner—Paul E. Maslousky
Attorney, Agent, or Firm—Frank L. Hart

[57] ABSTRACT

A hydraulic system for use in extremely cold environments has a pump for passing hydraulic fluid from a reservoir to a hydraulic cylinder of a work element via a control valve that is positioned a relatively great distance from the hydraulic cylinder. Fluid pathways are provided for substantially continuously moving hydraulic fluid between the control valve and hydraulic cylinder during operation of the pump.

5 Claims, 3 Drawing Figures

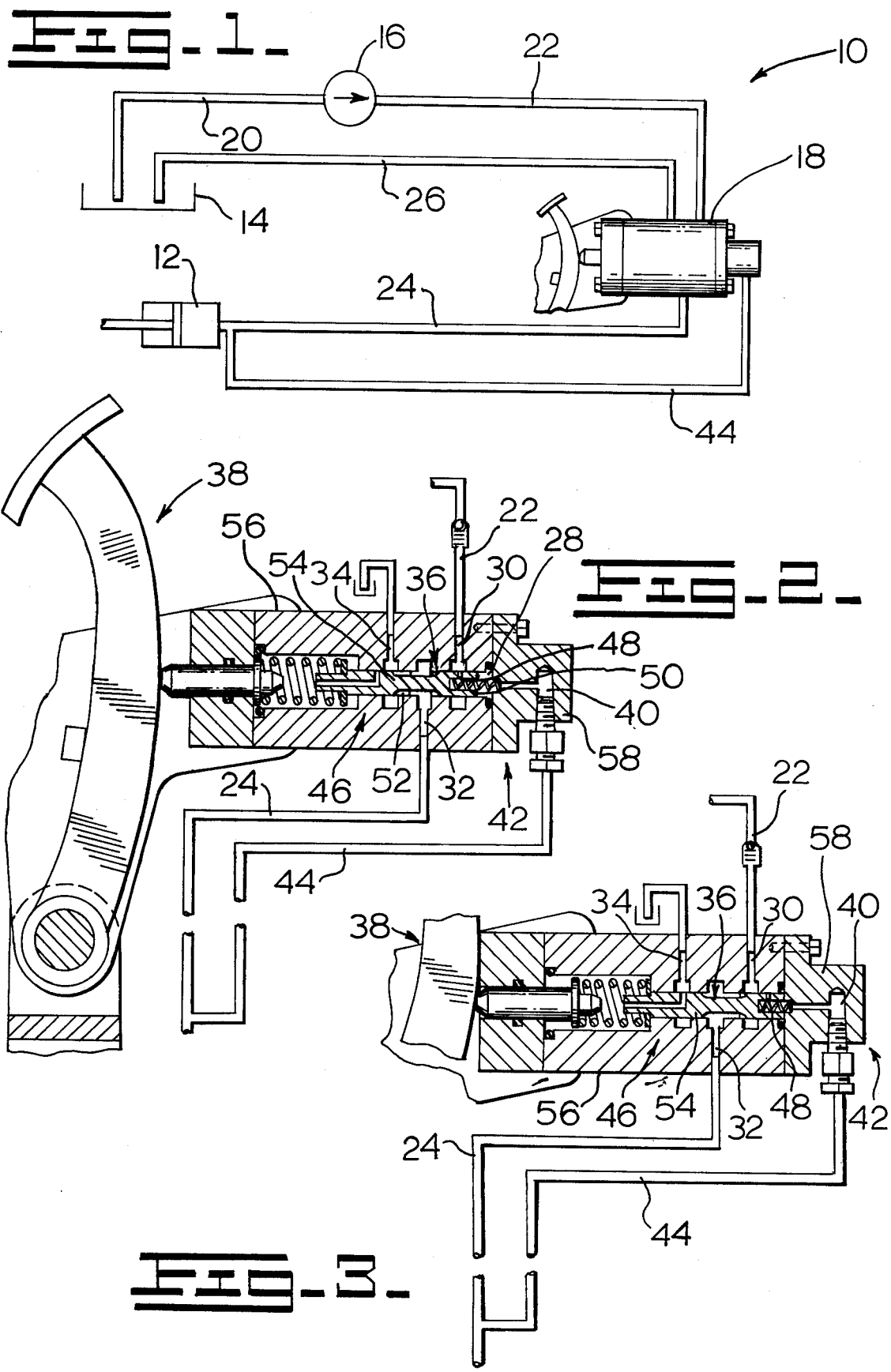

HYDRAULIC SYSTEM FOR EXTREMELY COLD ENVIRONMENTS

BACKGROUND OF THE DISCLOSURE

In the use of vehicles in extremely cold environments, as for example a crawler tractor in Alaska during the winter, an operator sometimes finds that the hydraulic fluid increases in viscosity to a magnitude sufficient to make the hydraulic system slow to respond. One of the principal locations at which the hydraulic fluid becomes excessively viscous is in the relatively long conduits which provide the fluid pathway between the control valve and the hydraulic cylinders which actuate the clutch and brakes of the crawler tractor. During extended operation without clutch actuation, the fluid in these long conduits can cool to a value at which the pump pressure is slow to move the viscous fluid in the conduit upon actuation of the control valve.

This invention solves the problem of hydraulic line "freeze up" during inactive periods of the associated work element by providing means for substantially continuously passing hydraulic fluid between the control unit and the hydraulic cylinder.

BRIEF DESCRIPTION OF THE DRAWINGS

FIG. 1 is a diagrammatic view of a portion of a hydraulic system of a vehicle having the apparatus of this invention;

FIG. 2 is a diagrammatic, enlarged view of a portion of the hydraulic system showing the control valve and associated hydraulic conduits; and FIG. 3 is a diagrammatic view of a portion of the apparatus of FIG. 2 with the spool of the control valve positioned at another location.

DETAILED DESCRIPTION OF THE INVENTION

Referring to FIG. 1, a vehicle hydraulic system 10 is provided for controllably passing hydraulic fluid to a hydraulically actuated cylinder 12 of a work element (not shown), for example a vehicle clutch or brake. The hydraulic system 10, as is known in the art, has a fluid reservoir 14, a pump 16, and a control valve 18 connected between the pump 16 and cylinder 12 and positioned a relatively great distance from the cylinder 12.

A conduit 20 is connected to an intake of the pump 16 for passing fluid from the reservoir 14 to the pump 16. A first means 22, for example a conduit, is provided for passing fluid from the pump 16 to the control valve 18, a second means 24, for example another conduit, is provided for passing fluid from the control valve 18 to the hydraulic cylinder 12, and a third means 26, for example another conduit, is provided for returning hydraulic fluid from the control valve 18 to the reservoir 14.

Referring to FIG. 2, the control valve 18 has a chamber 28 and first, second, and third ports 30,32,34 in fluid communication with the chamber 28. Each of the ports 30,32,34 is connected to a respective one of the first, second, and third means 22,24,26 for passing hydraulic fluid, as set forth above.

A spool 36 is slidably positioned within the housing chamber 28 and is movable in response to actuating control means 38, such as a brake or clutch pedal. The spool 36 is movable between a first position (FIG. 2) and a second position (FIG. 3). At the first position, a fluid pathway is open from the pump 16, through the control valve 18, and to the reservoir 14. At the second position, a fluid pathway is open from the pump 16, through the control valve 18, and to the hydraulic cylinder 12, and is of a magnitude sufficient for actuating said cylinder 12 by fluid passing through the pathway to the cylinder at a preselected rate.

In this invention, a fourth port 40 is opened into the control valve chamber 28 at a first end portion 42 of the valve 18. A circulating conduit 44 has one end connected to the fourth port 40 and the other end connected to the cylinder 12 or the second means 24 at a location immediately adjacent the hydraulic cylinder 12.

Fourth means 46 provides a fluid pathway from the pump 16, through the control valve 18, through the circulating conduit 44, through a portion or all of the second means 24, back through the control valve 18, and through the third means 26 to the reservoir 14 at the first position of the spool 36, as shown in FIG. 2. At the second position of the spool 36, the fourth means 46 provides for blocking the fluid pathway from the pump 16 to the circulating conduit 44 and provides a fluid pathway from the pump 16, through the control valve 18 and to the hydraulic cylinder 12 for the actuation thereof.

The fourth means 46 is provided by constructing the valve with openings such as holes, slots, or grooves at preselected locations relative to the travel limits of the spool 36.

Referring to FIGS. 2 and 3, a first opening 48, here a curvilinear hole, opens at one end on a side of the spool 36, extends through a portion of the spool 36, and opens on the spool first end 50. The first opening 48 can be a groove, an orifice, or other configuration, but is of a construction sufficient for communicating said first and fourth ports 30,40 through said first opening 48 at the first position of the spool (FIG. 2) and spacing said first opening 48 from the first port 30 at the second position of the spool 36 (FIG. 3) for blocking fluid communication of the first port 30 with the fourth port 40.

A second opening 52, such as a groove for example, is positioned on a middle portion 54 of the spool 36. The second opening is of a construction sufficient for communicating the second and third ports 32,34 at the first position of the spool 36 (FIG. 2) and, at the second position of the spool 36, spacing said second opening 52 from the third port 34 while communicating said first and second ports through said second opening 52.

In the embodiment shown in the drawings, the control valve 18 has a housing 56 having a removable end cap 58 with said fourth port 40 extending through said end cap 58.

During use of the hydraulic system, fluid from the pump 16 is circulated through the control valve 18, conduits 24,44 and back to the reservoir during periods when fluid is not being delivered to cylinder 12. Therefore, the fluid in the conduits between the control valve 18 and the cylinder 12 is not in a quiescent, exposed position for detrimentally increasing the viscosity thereof in response to chilling.

Other aspects, objects, and advantages of this invention will become apparent from a study of the specification, claims, and the drawings.

What is claimed is:

1. In a hydraulic system serving a hydraulically actuated cylinder of a work element that is expected to be utilized in an extremely cold environment, said hydraulic system having a fluid reservoir, a pump, a hydraulic cylinder, a control valve connected between the pump and the hydraulic cylinder and being positioned at a location spaced a relatively great distance from said cylinder, a conduit connected to the pump for passing fluid from the reservoir to the pump, first means for passing fluid from the pump to the control valve, second means for passing fluid from the control valve to the hydraulic cylinder, and third means for returning hydraulic fluid from the control valve to the reservoir, said control valve having a chamber and first, second, and third ports in fluid communication with the chamber and each being connected to a respective one of the first, second, and third means, a spool slidably positioned within the housing chamber and being movable between a first position at which a fluid pathway is open from the pump, through the control valve and to the reservoir and a second position at which a fluid pathway is open from the pump, through the control valve and to the hydraulic cylinder and of a magnitude sufficient for actuating said cylinder by fluid passing through said pathway to the cylinder, the improvement comprising:

- a fourth port opening into the control valve chamber;
- a circulating conduit connected at one end to the fourth port and at the other end to the second means at a location immediately adjacent the hydraulic cylinder; and
- fourth means for providing a fluid pathway from the pump, through the control valve, through the circulating conduit, through a portion of the second means, back through the control valve, and through the third means to the reservoir at the first position of the spool and, at the second position of the spool, for blocking the fluid pathway from the pump to the circulating conduit and providing a fluid pathway from the pump, through the control valve and through the second means and to the hydraulic cylinder for the actuation thereof.

2. A hydraulic system, as set forth in claim 1, wherein said fourth means comprises:

- a first opening extending through a portion of the spool and being of a construction sufficient for communicating said first and fourth ports through said first opening at the first position of the spool and spacing said first opening from the first port at the second position of the spool for blocking fluid communication of the first port with the fourth port; and
- a second opening on another portion of the spool and being of a construction sufficient for communicating the second and third ports at the first position of the spool and, at the second position of the spool, spacing said second opening from the third port and communicating said first and second ports through said second opening.

3. A hydraulic system, as set forth in claim 2, wherein the first opening is a hole of curvilinear configuration open at one end on the side of the spool and at the other end on an end of the spool adjacent the fourth port.

4. A hydraulic system, as set forth in claim 1, wherein the control valve has a housing having a removable end cap with said fourth port extending through said end cap.

5. A hydraulic system for operation in a cold environment, comprising:

- a source of hydraulic fluid having a delivery conduit and a return conduit;
- a work system including a hydraulic cylinder and conduit means connected to said cylinder, said conduit means including seperate flow paths individually extending away from said cylinder; and
- valve means connected to said conduits between said source and said work systems, said valve means being selectively changeable between a first operating condition at which said delivery conduit communicates with a selected one of said seperate flow paths and blocks the other of said flow paths for pressure operation of said cylinder, and a second operating condition at which said delivery conduit and said return conduit communicate with said separate flow paths and provide selective circulation of fluid through said hydraulic system at a flow rate sufficient for maintaining a relatively low viscosity highly responsive fluid condition in said conduit means, said fluid flowing through the selected flow path in a first direction in the first operating condition and, in the second operating condition, flowing continuously through the selected flow path in a second, opposed direction and through the other flow path.

* * * * *